United States Patent
Morfino et al.

(10) Patent No.: US 9,360,293 B2
(45) Date of Patent: Jun. 7, 2016

(54) CONTOUR BAND MATCHING TOOL AND METHODS

(71) Applicant: Quality Casting, Inc., New York, NY (US)

(72) Inventors: Carl Morfino, Colts Neck, NJ (US); Barry W. Smith, Weston, CT (US); Edward Yosevitz, Staten Island, NY (US); Peter Morfino, Colts Neck, NJ (US)

(73) Assignee: Quality Casting, Inc., Long Island City, NY (US)

( * ) Notice: Subject to any disclaimer, the term of this patent is extended or adjusted under 35 U.S.C. 154(b) by 94 days.

(21) Appl. No.: 14/197,491

(22) Filed: Mar. 5, 2014

(65) Prior Publication Data

US 2014/0250947 A1 Sep. 11, 2014

Related U.S. Application Data

(60) Provisional application No. 61/774,264, filed on Mar. 7, 2013.

(51) Int. Cl.
G01B 3/34 (2006.01)
G01B 5/20 (2006.01)
A44C 27/00 (2006.01)
A44C 9/00 (2006.01)

(52) U.S. Cl.
CPC .............. G01B 5/20 (2013.01); A44C 9/0015 (2013.01); A44C 27/00 (2013.01); G01B 3/34 (2013.01); Y10T 29/49593 (2015.01)

(58) Field of Classification Search
CPC ............. G01B 3/34; G01B 5/20; A44C 9/00; A44C 9/0007; A44C 9/0015; A44C 9/0023; A44C 27/00; B22D 13/06; B22D 13/063; B22D 25/02; B22D 25/026
USPC ........ 33/501.08, 501.45, 514.1, 555.1, 555.2; 29/8, 896.412; 63/15, 15.1, 15.2, 15.3, 63/15.4, 15.7
See application file for complete search history.

(56) References Cited

U.S. PATENT DOCUMENTS

| | | | | |
|---|---|---|---|---|
| 146,974 | A * | 2/1874 | Allen | A44C 9/02 33/494 |
| 524,589 | A * | 8/1894 | Gruebel | A44C 9/02 33/514.1 |
| 1,724,130 | A * | 8/1929 | Dayton | A44C 9/0023 63/1.16 |
| 2,150,962 | A * | 3/1939 | Curl | B22D 25/02 164/238 |
| 2,151,607 | A * | 3/1939 | Lovell | A44C 9/0023 63/15.3 |
| 2,177,314 | A * | 10/1939 | Von Dachenhausen | A44C 9/0023 63/15.4 |
| 3,548,506 | A * | 12/1970 | Harrington | A44C 9/02 206/303 |
| 4,118,948 | A * | 10/1978 | Gralnik | A44C 9/00 29/896.412 |
| 6,279,244 | B1 * | 8/2001 | Kelley | A44C 9/02 33/512 |
| 6,554,052 | B2 * | 4/2003 | Hashimian | A44C 27/00 164/35 |
| 7,593,786 | B2 * | 9/2009 | Saarela | B44B 3/009 700/117 |
| 7,845,077 | B1 * | 12/2010 | Alulis | A44C 9/02 264/296 |

FOREIGN PATENT DOCUMENTS

| | | | | |
|---|---|---|---|---|
| GB | 2464735 A | * | 4/2010 | ............... A44C 7/00 |
| JP | WO 8703459 A1 | * | 6/1987 | ........... A44C 9/0023 |

* cited by examiner

*Primary Examiner* — R. A. Smith
(74) *Attorney, Agent, or Firm* — Remenick PLLC

(57) ABSTRACT

The invention is directed to tools and methods for matching a first ring to a second ring. The apparatus comprises a plurality of contour bands, each contour band having a contoured portion that differs from the contoured portion of the other bands. Preferably the bands differ by increments such that a wide range of matching can be performed to identify a correct contour, which is then provided to a manufacturer for creation of the matching band.

22 Claims, 4 Drawing Sheets

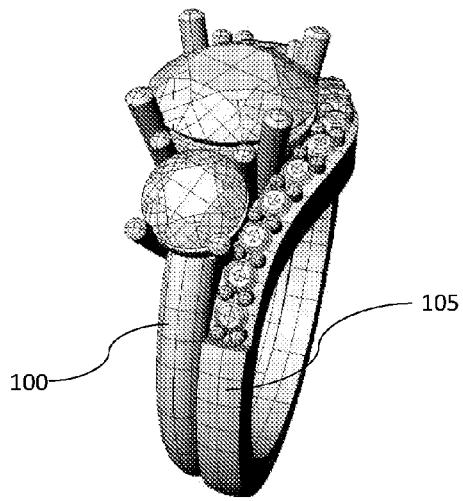
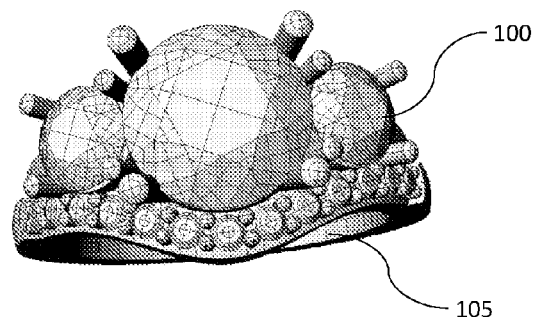
FIGURE 1B
FIGURE 1A
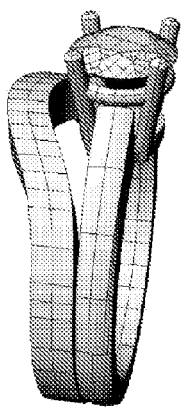
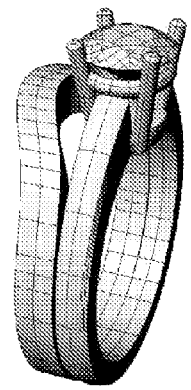
FIGURE 2A
(Prior Art)
FIGURE 2B
(Prior Art)

CONTOUR BAND MATCHING TOOL AND METHODS

REFERENCE TO RELATED APPLICATIONS

This application claims priority to U.S. Provisional Application No. 61/774264, filed Mar. 7, 2013, which is entitled "Contour Band Matching Tool and Methods," and is hereby specifically and entirely incorporated by reference.

BACKGROUND

1. Field of the Invention

The invention is directed to tools and methods for matching bands, and preferably engagement rings with wedding rings. In particularly, the invention is directed to an apparatus and methods for matching the contour of an engagement ring to the contour of a wedding ring such that both rings can be worn together.

2. Description of the Background

Engagement rings (generically, bands) have ancient roots, going back to the time of the Ancient Egyptians. In modern times, an engagement ring is usually a gift from one member of a couple to the other member, indicating the giver's intent to many the receiver. Engagement rings are typically worn on the ring finger of the left hand, however they can be worn on other fingers or the right hand. Engagement rings are usually made of a precious metal (e.g. gold, silver, or platinum and alloys thereof), however they can be made of other metals (e.g. titanium, steel, or brass) or other materials. Furthermore, engagement rings typically include one or more gemstones (e.g. diamonds, sapphires, rubies, or emeralds) or other adornment. The gemstones can be manmade or naturally occurring.

An example of a traditional engagement ring 100 can be found in FIGS. 1A and 1B. In the engagement rings shown in the Figures, there are three diamonds; a larger central diamond and two, smaller, side diamonds. The size, shape, number, type, and arrangement of gemstones in engagement rings widely vary. The features of the engagement ring combine to give the engagement ring an outer silhouette, contour, or curvature. Either side of the ring may have the same silhouette or a different silhouette.

Under modern tradition, on or around the wedding date, the bride and groom exchange wedding rings. A wedding ring typically complements the engagement ring, such that both can be worn securely together on the same finger. Wedding rings are typically composed of a precious metal (e.g. gold, silver, or platinum and alloys thereof), however they can be made of a variety of other metals (e.g. titanium, steel, or brass) or other materials (e.g., carbon fibers, plastics). Furthermore, engagement rings typically include one or more gemstones (e.g. diamonds, sapphires, rubies, or emeralds) or other adornment. The gemstones can be manmade or naturally occurring.

As shown in FIGS. 1A and 1B, often, the wedding band 105 is formed to match or complement the silhouette of the engagement ring 100 by sitting flush against the contours of the engagement ring. As can be seen in the Figures, the bottom of the wedding band is parallel to the bottom of the engagement ring. However, the top of the wedding band flairs out to accommodate the gemstones of the engagement ring. FIGS. 2A and 2B depict sets of engagement rings and wedding bands that do not properly match. As can be seen in FIGS. 2A and 2B, for example, when the engagement ring and wedding band are mismatched, there can be wide gaps between the heads and/or the shanks of the rings.

Conventionally, obtaining a correctly matching set of an engagement ring and a wedding ring requires that the two rings to be purchased together or that the engagement ring be sent to a skilled jeweler or manufacturer that will create a matching wedding ring. The purchasing of the two rings at the same time is often monetarily prohibitive and, as engagement rings are usually surprise gifts, often does not allow the receiver of the engagement ring have input on the choice and appearance of the wedding ring. To send the engagement ring to the skilled craftsman is expensive and time consuming, and requires the owner of the engagement ring to relinquish possession of the ring for an extended period of time, often at substantial risk of loss. There is a need to easily and quickly match a wedding ring contour to an engagement ring contour with reduced risk and expense.

SUMMARY OF THE INVENTION

The present invention overcomes the problems and disadvantages associated with current strategies and designs and provides new tools and methods of matching wedding band contours to engagement rings.

One embodiment of the invention is directed to a system for matching a first ring to a second ring. The system comprises a plurality of contour bands, each contour band having a shank and a top, wherein at least a portion of each top has a curvature and the curvature of each contour band is different from the curvature of other contour bands.

Preferably, each contour band is marked with a unique identifier. Each unique identifier preferably corresponds to a mold for manufacturing the first ring. In a preferred embodiment, the curvature of each contour band flairs to one side of the contour band. Preferably, the first ring is a wedding ring and second ring is an engagement band. Preferably, the curvature of the top of at least one contour band matches a silhouette of the engagement band.

The system may further comprise a retainment device to maintain the plurality of contour bands in close proximity. Preferably, there are at least 10 contour bands. In a preferred embodiment, the inner diameter of each contour band is at least 14 mm. Preferably, the curvature of each contour band is comprised of two side curves and a central curve.

Another embodiment of the invention is directed to a method of manufacturing a first ring to match a second ring. The method comprises the steps of providing a plurality of contour bands, each contour band having a shank and a top, wherein at least a portion of each top has a curvature, matching at least one contour band to the second ring, and manufacturing the first ring based on the matched contour band. The curvature of each contour band is different from the curvature of other contour bands.

Preferably, the method further comprises obtaining design characteristics of the first ring and manufacturing the first ring to include the design characteristics. Each contour band is preferably marked with a unique identifier. The method preferably further comprises obtaining a mold corresponding to the unique identifier to manufacturing the first ring. The method preferably further comprises obtaining a size for the first ring.

Preferably, the first ring is a wedding ring and the second ring is an engagement band. In a preferred embodiment, the curvature of the top of at least one contour band matches a silhouette of the engagement band. Preferably, the curved top of each contour band is comprised of two side curves and a central curve.

Another embodiment of the invention is directed to an apparatus for matching the contour of a ring. The apparatus comprises a plurality of rigid bands, wherein each rigid band is a loop structure comprised of a top portion, a surface of each top portion is contoured, and the contour of the surface of each top portion of each of the plurality of rigid bands differs for each rigid band.

Other embodiments and advantages of the invention are set forth in part in the description, which follows, and in part, may be obvious from this description, or may be learned from the practice of the invention.

DESCRIPTION OF THE DRAWINGS

The invention is described in greater detail by way of example only and with reference to the attached drawing, in which:

FIGS. 1A and 1B depict properly matched engagement rings and wedding bands.

FIGS. 2A and 2B depict improperly matched engagement rings and wedding bands.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention When creating a wedding ring it is often desirable to match the contour of the wedding ring to the engagement ring so that both rings can be worn together on the same finger. Contour matching has typically required that the engagement ring be returned to a manufacturer for sizing and matching to a desired wedding ring by skilled jewelers. Not only is the consumer deprived of the ring for a substantial period of time, but there are also significant expenses and risks associated with transmittal of the ring back and forth between a particular store and a manufacturer. As a consequence, there is a significant added expense and loss in transit is not uncommon.

It has been surprisingly discovered that contour matching can be performed immediately within a store by relatively unskilled persons without any need to send the ring to the manufacturer. Not only are the risks associated with loss minimized, but there is a tremendous costs savings as well. The invention is directed to a tool that can be used with minimal training, which allows a ring contour to be matched immediately to an engagement ring. The tool or kit comprises a plurality of preferably rigid bands, each band containing a contoured portion that differs by increments from the contour portions of the remaining bands. Each band has a unique identifier that can be provided to the manufacturer of the second band that allows the skilled jeweler to create the correct contour to match the contour of the first band. The contour may comprise any component in the structure of the surface, including but not limited to shapes, diameters, curves, flairs, twists, designs including letters, artistic and practical designs, patterns and the like. Also, as the goal is to match a particular contour, it may not be necessary to use bands that allow for matching of finger size, which typically is already known. Thus, the bands of the plurality may be closed or open loops, and most any size that allows for matching of the contours and not necessarily specific for finger size. In a preferred embodiment, specific manufacturers of popular ring designs may have unique contour bands that allow for matching to the popular rings. Accordingly, another embodiment of the invention is directed to tools and methods that are specific to certain ring designs to provide specific ring matching.

Figure 3:
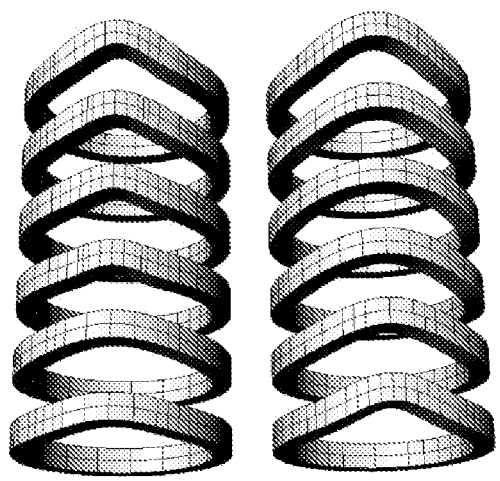
FIG. 3 depicts an embodiment of a set of contour bands.

FIG. 3 depicts an embodiment of a set of contour bands. Each contour band is a measuring device for use in matching the contours of a first band, preferably an engagement ring, to the desired contour of a second band, preferably a wedding ring. In the embodiment depicted in FIG. 3 there are 12 contour bands per set. However, there can be more or less contour bands per set, preferably the tool comprises at least 5 bands, more preferably at least 7, more preferably at least 10, and more preferably at least 12 or more. Preferably, each contour band is unique from the other contour bands. For example, each contour band may have a straight bottom portion (e.g. shank or hoop) and a curved top portion (e.g. bezel or head). Preferably the curved, top portion of each contour band flairs to one side of the band. Each curved top portion preferably has a curvature that differs from the curvature of the curved top portion of the other contour bands, thereby providing each contour band with a unique curvature. The contour bands may have different radii of curvature, different depression of curvatures, different positioning of the curvatures, and/or additional differences of curvatures shape, design and/or structure.

Figure 4A:
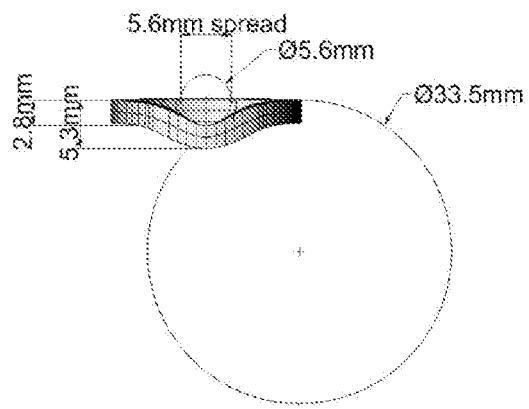
FIGS. 4A and 4B depict two embodiments of contour bands.
Figure 4B:
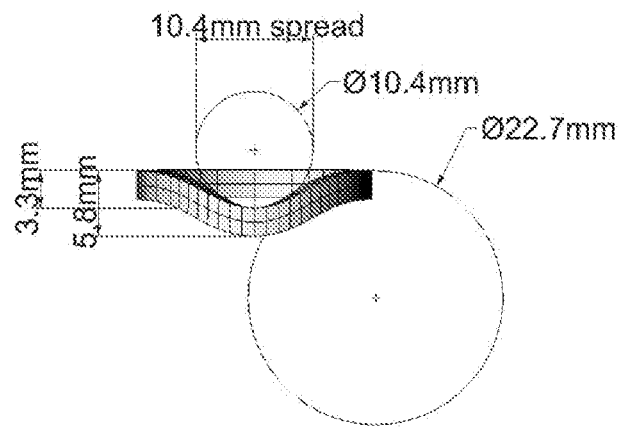

For example, FIGS. 4A and 4B depict two different embodiments of contour bands. Each band preferably has two side curves and a central curve. The side curves of each contour band preferably have the same diameters, however they may have different diameters. In the preferred embodiment, the side curves cause the top of the contour band to flair out from the straight shank (down in the Figures) and are connected by the central curve. As shown in FIGS. 4A-B, the side curves may have larger diameters than the central curve. However, the side curves may have diameters equal to or smaller than the diameter of the central curve. As can be seen in FIGS. 4A-B, the diameters of the side curves, the points of connection to the central curve, and the diameter of the central curve, together, dictate the shape of the top of the contour band. For example, in FIG. 4A, where the diameters of the side curves are nearly six times the diameter of the central curve, the top of the contour band flairs out 5.3 mm. While in the embodiment shown in FIG. 4B, where the diameters of the side curves are only about twice the diameter of the central curve, the top of the contour band flairs out 5.8 mm. As can be seen in the Figures, the contour ring shown in FIG. 4B, with the larger central curve diameter, can match to a larger engagement band than the contour ring shown in FIG. 4A.

Each contour band is designed to match the silhouette of one or more engagement rings. While the set of contour bands may not match every engagement ring, they will preferably match the majority of engagement rings. Additionally, the contour bands may be used to match rings other than engagement rings or even non-ring pieces. Preferably, each contour band is identified with a unique identifier. The unique identifier can be letters, numbers, symbols, or a combination thereof. The unique identifiers are preferably permanently affixed to each contour band. For example the unique identifier can be etched on, engraved, painted on, welded, or otherwise affixed. The unique identifiers can also be stored separately from the contour bands. Preferably, each unique identifier is associated with a finished wedding band.

Each contour band is preferably made of an inexpensive, durable material. For example each contour band may be steel, brass, carbon fiber, plastic, or other naturally occurring or manmade materials. However, each band may be made of a precious medal (e.g. gold, silver, or platinum). Each contour band is preferably at least 14 mm in inner diameter. However, each contour band can have smaller or larger dimensions. In a preferred embodiment, one size of contour band will match multiple sizes of engagement rings. However, especially for people with larger or smaller fingers, there may be contour bands in different sizes to match different sized engagement bands.

Figure 7:
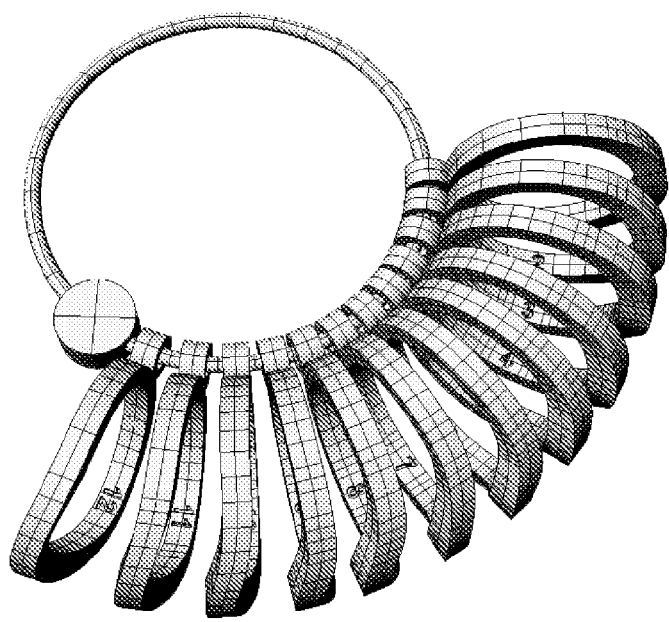
FIG. 7 depicts an embodiment of a ring of contour bands.

In a preferred embodiment, the set of contour bands are preferably maintained on a ring or other retention device, similarly to a set of sizing rings. For example, FIG. 7 depicts 12 contour bands maintained on a ring. The contour bands, however, may be kept in a display case, a box, or other containment device. In the embodiment where the contour bands are kept on a ring, each contour band may have a loop or other connector for engagement with the ring.

Figure 5A:
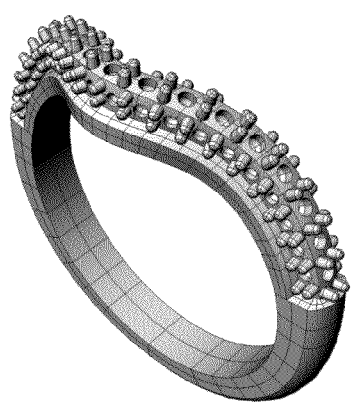
FIGS. 5A-E depict various design options for finished wedding bands.
Figure 5B:
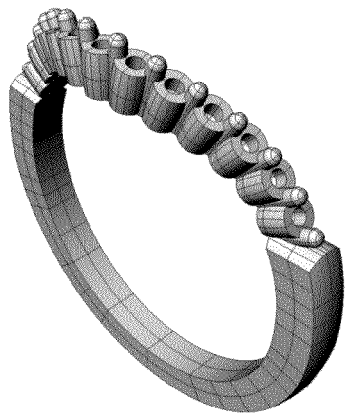
Figure 5C:
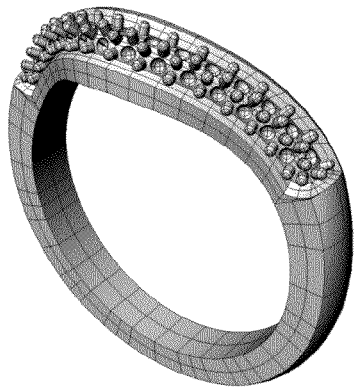
Figure 5D:
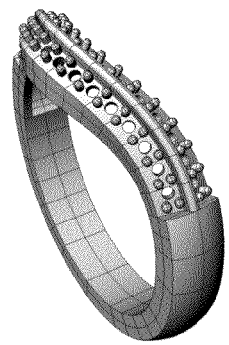
Figure 5E:
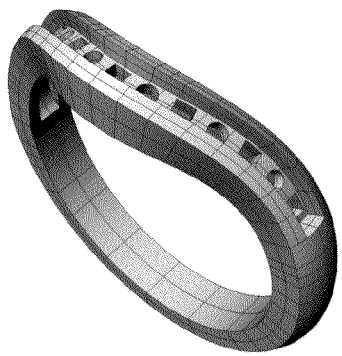

When a customer enters a jewelry store, department store, or other seller of wedding bands, the merchant or customer preferably tests each contour band until a satisfactory match is made between the shape of the contour band and the shape of the engagement ring. Preferably, the customer does not have to take off the engagement ring to match the contour bands. The merchant will then preferably obtain the size of the customer's finger and, along with, the unique identifier from the selected contour band, order a wedding band. The order may include the material of the wedding band, any designs, gemstones, settings or other design characteristics of the wedding band that the customer desires. For example, FIGS. 5A-E depict various design options for the wedding band. FIG. 5A depicts a wedding band having two side rows of stones and a top row of stones. FIG. 5B depicts a wedding band having a shared single prong setting down the center. FIG. 5C depicts a wedding band having two rows of stones that are beveled to one side and the opposing side is a plain wall to abut the engagement ring. FIG. 5D depicts a wedding band having a channel set that alternates round and princess cut stones. FIG. 5E depicts a wedding band having two rows of stones on a slant with a raised knife edge wall in the center. These design options are exemplary and other designs can be included in the final wedding ring.

Figure 6:
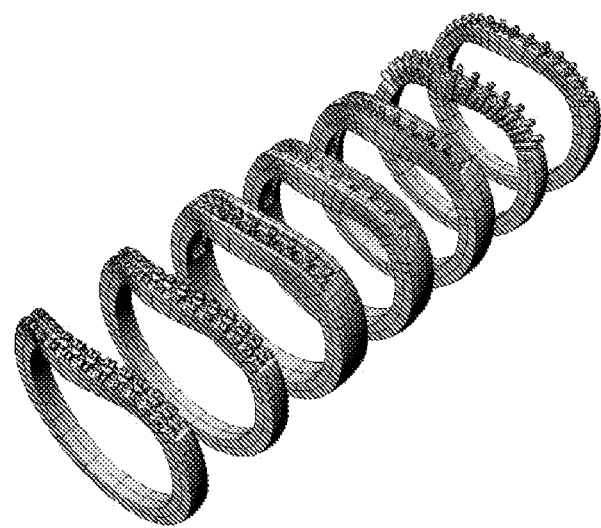
FIG. 6 depicts embodiments of finished wedding bands.

Preferably, the order will be sent to a manufacturing facility for manufacturing of the wedding band. However, in some embodiments, the merchant may be able to manufacture the wedding band on premises. For ease and speed of manufacture, each unique identifier, size, design, setting, and/or other design characteristic may be associated with a particular ring mold. The manufacturer may obtain the appropriate ring mold to fulfill the order and manufacture the ring. The manufacturer may finish the ring by setting stones, polishing, and/or other finishing techniques. In the preferred embodiment, the manufacturer will send the finished wedding ring to the merchant or customer upon completion. FIG. 6 depicts several styles of unset wedding bands manufactured by the process described herein. The styles of wedding bands displayed in FIG. 6 include channel settings, cut-down-shared prong settings, cut-down-split prong settings, shard prong settings, mock channel settings, pave settings, and scalloped settings.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A system for matching a first ring to a second ring, comprising:
   a plurality of contour bands, each contour band having an interior circumference, an exterior circumference, a shank and a top, wherein at least a portion of each top has a curvature in a direction perpendicular to the exterior and interior circumferences;
   wherein the curvature of each contour band is different from the curvature of the other contour bands.

2. The system of claim 1, wherein each contour band is marked with a unique identifier.

3. The system of claim 2, wherein each unique identifier corresponds to a mold for manufacturing the first ring.

4. The system of claim 1, wherein the curvature of each contour band flairs to one side of the contour band.

5. The system of claim 1, wherein the first ring is a wedding ring.

6. The system of claim 1, wherein the second ring is an engagement band.

7. The system of claim 6, wherein the curvature of the top of at least one contour band matches a silhouette of the engagement band.

8. The system of claim 1, further comprising a retainment device to maintain the plurality of contour bands in close proximity.

9. The system of claim 1, wherein there are at least 10 contour bands.

10. The system of claim 1, wherein the inner circumference of each contour band is equal to the inner circumference of each other contour band.

11. The system of claim 1, wherein the curvature of each contour band is comprised of two side curves and a central curve.

12. A method of manufacturing a first ring to match a second ring, comprising the steps of:
    providing a plurality of contour bands, each contour band having an interior circumference, an exterior circumference, a shank and a top, wherein at least a portion of each top has a curvature in a direction perpendicular to the exterior and interior circumferences;
    wherein the curvature of each contour band is different from the curvature of the other contour bands;
    matching at least one contour band to the second ring; and
    manufacturing the first ring based on the matched contour band.

13. The method of claim 12, further comprising obtaining design characteristics of the first ring and manufacturing the first ring to include the design characteristics.

14. The method of claim 12, wherein each contour band is marked with a unique identifier.

15. The method of claim 14, further comprising obtaining a mold corresponding to the unique identifier to manufacture the first ring.

16. The method of claim 12, further comprising obtaining a size for the first ring.

17. The method of claim 12, wherein the first ring is a wedding ring.

18. The method of claim 12, wherein the second ring is an engagement band.

19. The method of claim 18, wherein the curvature of the top of at least one contour band matches a silhouette of the engagement band.

20. The method of claim 12, wherein the curved top of each contour band is comprised of two side curves and a central curve.

21. A ring manufactured by the method of claim 12.

22. An apparatus for matching the contour of a ring comprising:
   a plurality of rigid bands, wherein:
      each rigid band is a loop structure comprised of an interior circumference, an exterior circumference, and a top portion,
      a surface of each top portion is contoured in a direction perpendicular to the exterior and interior circumferences, and
      the contour of the surface of each top portion of each of the plurality of rigid bands differs for each rigid band.

* * * * *